United States Patent
Claiborne

(10) Patent No.: US 7,100,159 B2
(45) Date of Patent: Aug. 29, 2006

(54) METHOD, APPARATUS AND MEANS FOR SILENTLY CUSTOMIZING SOFTWARE WITHIN A MULTI-PLATFORM ENVIRONMENT

(75) Inventor: Andrew E. Claiborne, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 638 days.

(21) Appl. No.: 10/287,567

(22) Filed: Nov. 4, 2002

(65) Prior Publication Data

US 2004/0088698 A1    May 6, 2004

(51) Int. Cl.
*G06F 9/445* (2006.01)
(52) U.S. Cl. .................... 717/174; 717/177; 717/176
(58) Field of Classification Search ................ 717/174, 717/176, 178, 107, 103; 709/217, 221, 223, 709/202, 203; 707/103 R; 710/100, 301; 705/14, 39; 712/43
See application file for complete search history.

(56) References Cited

U.S. PATENT DOCUMENTS

| | | | | |
|---|---|---|---|---|
| 5,867,713 A | * | 2/1999 | Shrader et al. | 717/176 |
| 6,094,531 A | * | 7/2000 | Allison et al. | 717/176 |
| 6,219,698 B1 | * | 4/2001 | Iannucci et al. | 709/221 |
| 6,237,135 B1 | * | 5/2001 | Timbol | 717/107 |
| 6,301,585 B1 | * | 10/2001 | Milne | 707/103 R |
| 6,938,250 B1 | * | 8/2005 | Cohen et al. | 717/178 |
| 2003/0074256 A1 | * | 4/2003 | LaCroix | 705/14 |

* cited by examiner

*Primary Examiner*—Wei Zhen
*Assistant Examiner*—Anna Deng

(57) ABSTRACT

A method, apparatus, and means for silently customizing software within a multi-platform environment. A software grouping is copied from a control server to a software source server and de-serialized. The software grouping is customized by the control server passing user information to the software source server, where the information is then stored in a response file inside of the software grouping. The response file is then used to remotely customize the installation of the software grouping on workstations.

9 Claims, 9 Drawing Sheets

Manage Software Grouping

| Field | |
|---|---|
| Software Groupings | ☐ |
| Contact | ☐ |
| Software source server | ☐ |
| Directory path for new software grouping | ☐ |
| Software source server username | ☐ |
| Software source server password | ☐ |
| Confirm password | ☐ |
| System handle | ☐ |
| System location | ☐ |
| Proxy server | ☐ |
| Proxy server port | ☐ |
| Porxy server username | ☐ |
| Proxy server password | ☐ |
| Confirm password | ☐ |

- ☐ Send email when a Support Analyst is assigned to the incident
- ☐ Send email when a Support Analyst wants to run a diagnostic or repair routine to help analyze the incident
- ☐ Send email when a Support Analyst closes the incident
- ☐ Require approval before a Support Analyst is allowed to run a diagnostic or repair routine
- ☐ Allow diagnostic routines access to networked devices
- ☐ Allow dianostic routines global read access
- ☐ Allow dianostic routines global write access
- ☐ Allow diagnostic routines global delete access
- ☐ Allow diagnostic routines global execution access

[ Create Software Grouping ]    [ Cancel ]

*FIG. 7*

Install a new client

| | |
|---:|:---|
| Software Grouping | ☐ |
| Client hostname | ☐ |
| Client username | ☐ |
| Client password | ☐ |
| Confirm Password | ☐ |

[ Install Client ]　[ Uninstall Client ]　[ Cancel ]

*FIG. 8*

METHOD, APPARATUS AND MEANS FOR SILENTLY CUSTOMIZING SOFTWARE WITHIN A MULTI-PLATFORM ENVIRONMENT

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to a method and apparatus for remotely customizing the installation of software on a computer system from a second computer system running a different operating system.

2. Description of Related Art

Typically, to install products that require custom user information, users must install the product on each machine, and then, after the installation, provide the user information to the product through some type of interface. This procedure is problematic for customers with many systems that require identical information because they have to manually launch and interact with interfaces on every system they install. Additionally, while some current programs allow remote installation, those machines must be running the same operating system for the remote system to be able to customize the installation.

A typical business computer configuration would include a computer system running the Windows operating system, connected to a series of HP-UX systems running the Unix operating system. The HP-UX operating system uses Software Distributor as its standard method for packaging and installing software. Software Distributor packages can only be built on HP-UX systems, can be converted to a single binary file, and cannot accept any user input during the installation process.

Software Distributor has four levels of software grouping: bundle, product, subproduct, and fileset. The basic unit of software distribution is the product. A product can contain both subproducts and filesets. Filesets are the atomic units of software distribution, and they contain a set of files and control scripts. Subproducts contain filesets and are used to conveniently manage logical subsets of a single product. Bundles are collections of products or filesets that may be installed as a unit. A depot is a collection of one or more bundles and or products.

To install a software grouping via Software Distributor on to the HP-UX systems, the user would have to log on to each of the HP-UX systems, install the software grouping, customizing each installation the same way on each system. There is not currently a supported way to customize a Software Distributor software grouping from an operating system other than HP-UX.

Customers can customize a Software Distributor bundle after it is installed. This is typically achieved by including documentation with the software product that instructs the user to fill out a configuration file or run an interactive script after the installation completes. This is problematic because customers may not read the documentation so they will not know to perform the configuration steps. This is also problematic and error-prone for customers who install the software on many systems because they have to spend a lot of time entering the same information over and over again on every system that is installed.

Software Distributor's "swask" command can be used to customize a Software Distributor bundle before it is installed. Unfortunately, its use is discouraged because the Software Distributor's user interface does not support the command. To customize software groupings this way, users have to know about this obscure Software Distributor command and understand the command-line syntax of Software Distributor commands. Even with use of the "swask" command, the user would have to execute it on a HP-UX machine, not the Windows machine.

BRIEF SUMMARY OF THE INVENTION

A method, apparatus, and means for silently customizing software within a multi-platform environment. A software grouping is copied from a control server to a software source server and de-serialized. The software grouping is customized by the control server passing user information to the software source server, where the information is then stored in a response file inside of the software grouping. The response file is then used to remotely customize the installation of the software grouping on workstations.

BRIEF DESCRIPTION OF THE SEVERAL VIEWS OF THE DRAWINGS

FIG. 7 is a sample user interface screen shot to customize a software grouping.

FIG. 8 is a sample user interface screen shot to install a software grouping on a workstation.

DETAILED DESCRIPTION OF THE EMBODIMENTS

Silently customizing software in a multi-platform environment, according to an embodiment of the present invention, allows a user to customize the installation of a program on other computers from a computer that cannot read or understand the program to be installed. Unlike prior art based on manual customization of programs at every workstation, the present invention allows the program to be customized once, then automatically installed on the workstations without any user interaction at the workstations. Additionally, unlike prior art, the customization can be done on a system running a different operating system.

Figure 1:
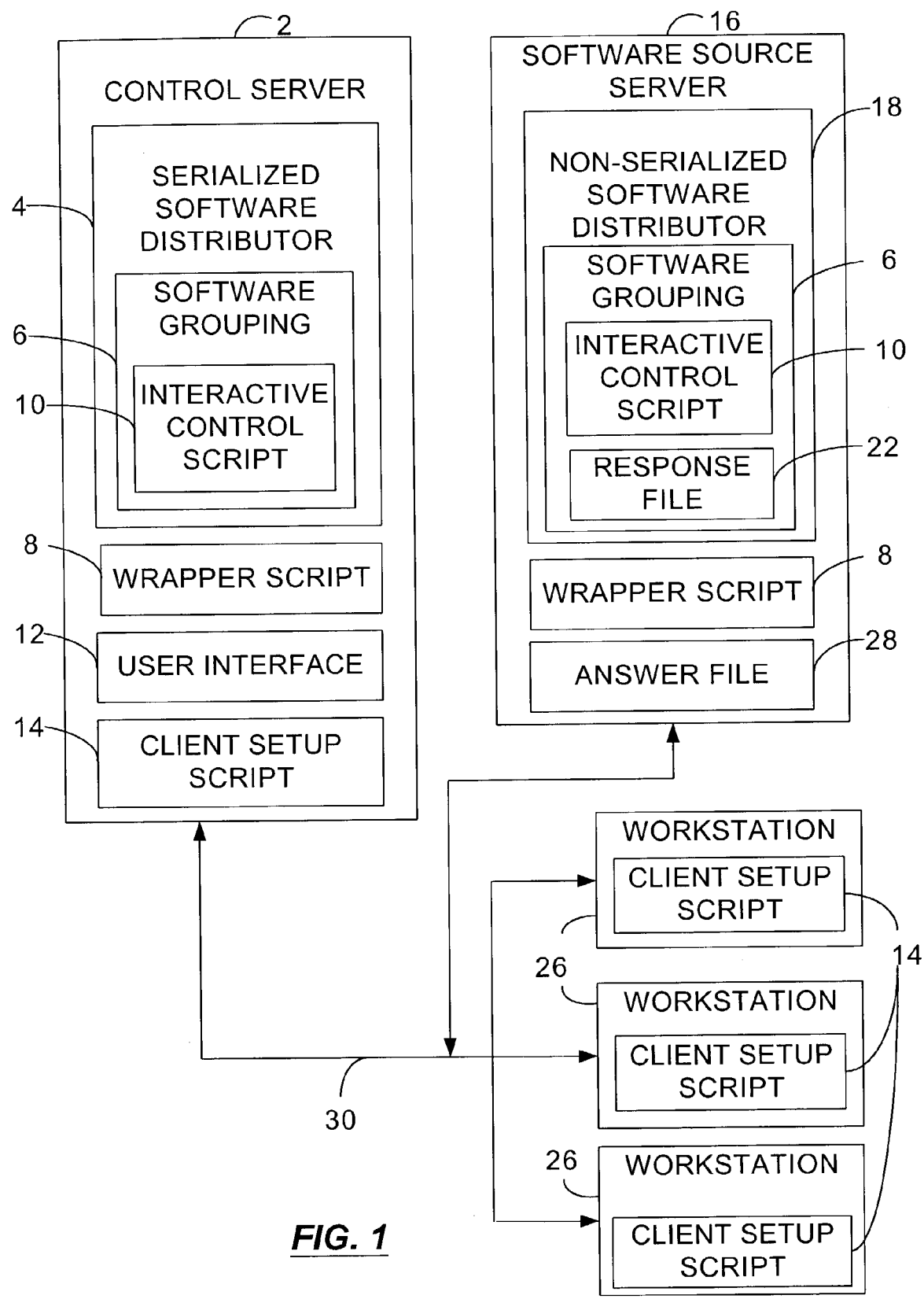
FIG. 1 is a block diagram illustrating a typical business computer configuration upon which an embodiment of the present invention may be implemented.

Now referring to FIG. 1, there is illustrated a control server 2, a software source server 16, and several workstations 26 upon which an embodiment of the present invention may be implemented. The control server 2 may be a computer system running a version of Windows as its operating system. The software source server 16 and the workstations 26 may be HP-UX computers running Unix as their operating system. It should be noted that the software source server 16 could also be a workstation 26. Different combinations of operating systems are also possible, such as the software source server 16 and the workstations 26 running the Linix operating system. One of the advantages of the present invention is that it allows a control server 2 to be running a different operating system from the software source server 16 and the workstations 26 and still be able to customize the installations of programs on the workstations 26.

The control server 2, the software source server 16, and the workstations 26, in the present embodiment are connected via a network 30. However, any connection allowing the transferring of information would work in the present invention, such as an Internet connection, a dial up connection, combinations of these connections, and other forms of communication between computers.

Located on the control server 2 is the serialized software distributor 4. Software distributor is HP-UX's standard program for packaging and installing software. However, systems running windows, such as the control server 2, are unable to read the software distributor so it is stored as one large file on the control server 2 in a serialized format, creating a serialized software distributor 4. Serialized format means that as far as the control server 2 is concerned, the software distributer is just one large file containing a string of binary numbers. As part of the serialized software distributor is a software grouping 6, which in turn contains an interactive control script 10. These files are not accessible until the software distributor has been de-serialized on a machine that can read it, a HP-UX machine.

Also located on the control server 2, is a wrapper script 8, a user interface 12, and a client setup script 14. The wrapper script 8 allows the control of the customization process. The user interface 12 may be a graphical user interface ("GUI") that allows the user of the control server 2 to control the entire customization and installation of the software grouping 6 on the workstations 26. The client setup script 14 allows the customized software grouping to be installed on the individual workstations 26. Alternatively, the client setup script 14 could allow simultaneous installation of the software grouping 6 on the multiple workstations 26.

Figure 2:
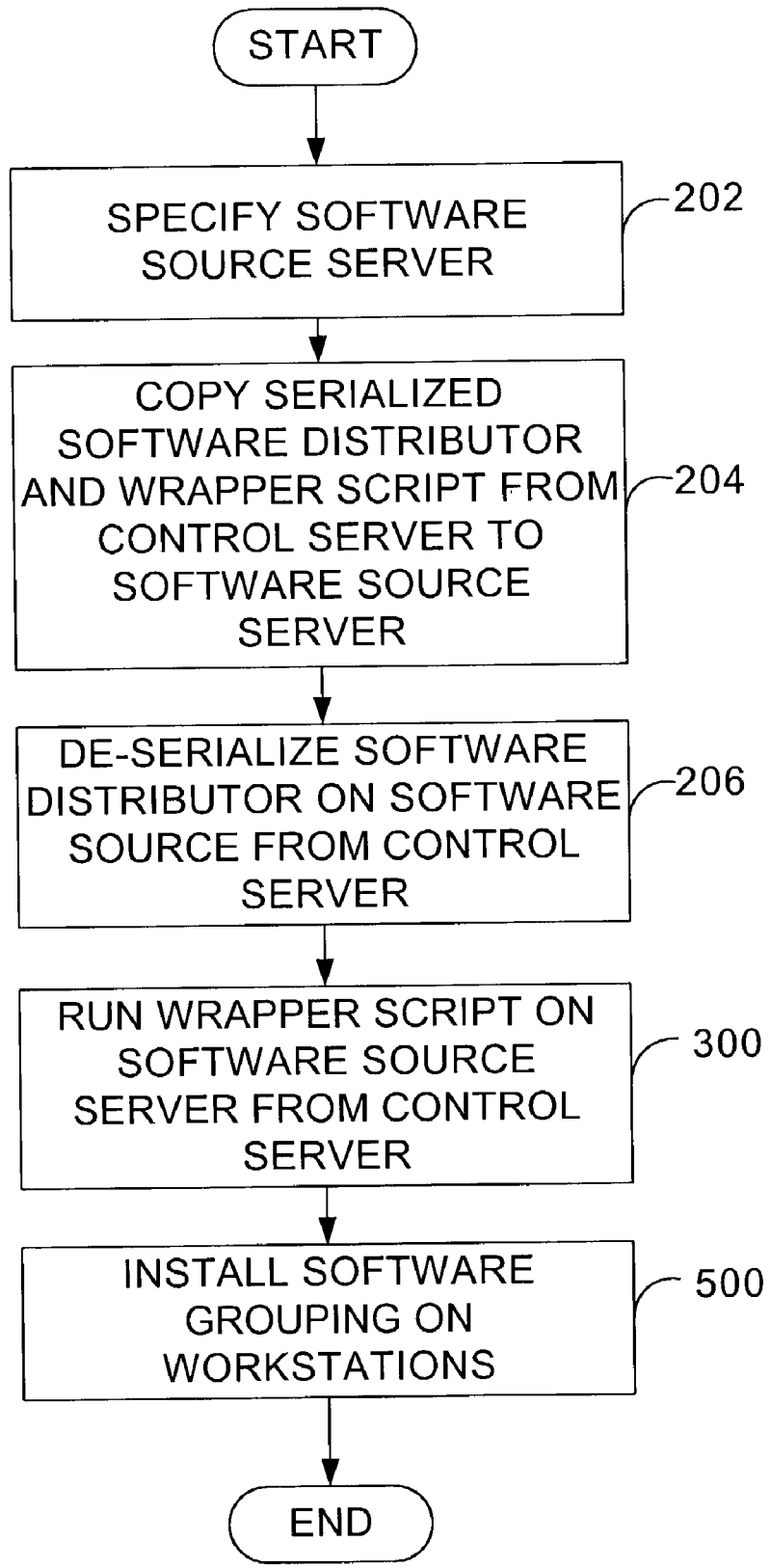
FIG. 2 is a flow chart illustrating the operation of an embodiment of the present invention.

Now referring to FIG. 2, the overall procedure used in this embodiment is described. At step 202, the user of the control server 2, while running the user interface 12, specifies what HP-UX machine connected to the network 30 that the user would like to use as the software source server 16. At step 204, the user interface then copies the serialized software distributor 4 and the wrapper script 8 to the software source server 16. The user interface 12 is able to uses the rexec command to execute commands on the software source server 16 from the control server 2. At step 206, the serialized software distributor 4 is de-serialized by the user interface 12 executing a "rexec swcopy" command on the serialized software distributor 4. The software source server 16 is now able to access the sub-parts of the de-serialized software distributor 18, namely the software grouping 6 and the interactive control script 10. At step 300, the user interface 12, using the "rexec" command, executes the wrapper script 8 now located on the software source server 16. The wrapper script 8 customizes the software grouping 6 for installation on the workstations 26. At step 500, the customized software grouping is installed on the individual workstations 26.

Figure 3:
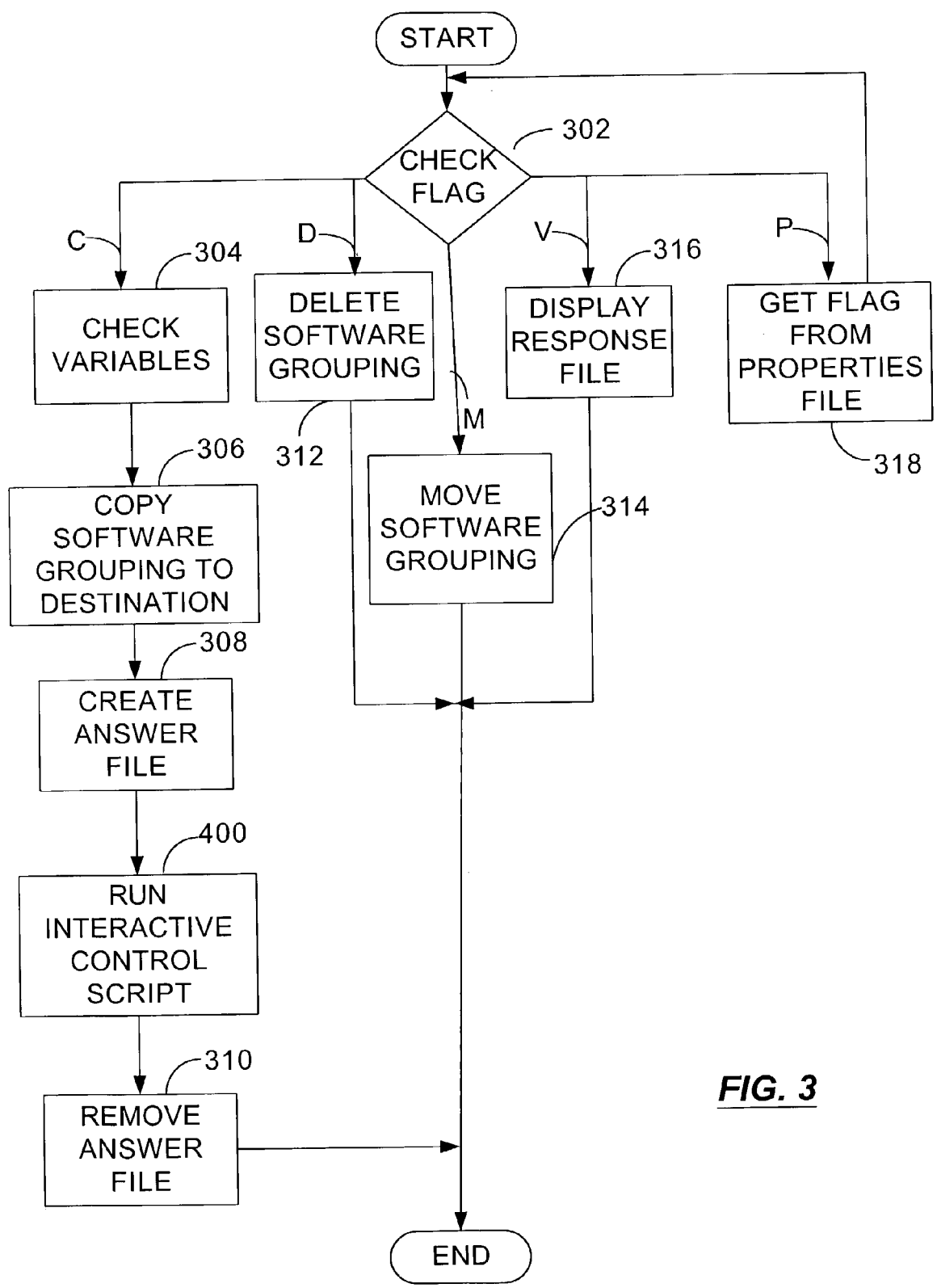
FIG. 3 is a flow chart illustrating the wrapper script used in the present embodiment.

Now referring to FIG. 3, the wrapper script 8 is described in more detail. The wrapper script 8 is a robust program allowing five different procedures to be performed. At step 302, the flag used to execute the program is checked. A 'p' flag indicates that another file is specified. The program branches to step 318 and retrieves a new flag from the specified file and returns to step 302 with the new flag. A 'v' flag indicates that the user would like to view the response file 22 in the software grouping 6. The response file 22 contains the customization information to be used in customizing the installation of the software grouping 6 and is created by the interactive control script 10 as detailed below and in FIG. 4. The program branches to 316, displays the contents of the response file 22, and terminates. An 'm' flag indicates that the user would like to move the software grouping 6 from its current location on the software source server 16 to another location on the software source server 16 or to another location on a different software source server 16. The program branches to step 314 where the program executes a "swcopy" command, copying the software grouping 6 to the new location, deleting the software grouping 6 from its current location on the software source server 16, and terminates. A 'd' flag indicates that the user wants to delete the software grouping 6 from its current location on the software source server 16. The program branches to step 312, deletes the software grouping 6, and terminates. A 'c' flag indicates that the user wants to customize the installation of the software grouping 6.

To customize the software grouping 6, the program branches to step 304. (See Appendix B). The user specifies how they would like the software grouping 6 customized using the user interface 12 (see FIG. 7). In this embodiment, the user interface 12 passes to the wrapper script 8 the following information:

the location the user wants the software grouping 6 to be located at
the person to contact should a user have problems with the program
the contact person's email address
the contact person's job title
the contact person's available hours
the company name
the company address
the company phone number
the company fax number
the control server's handle
the control server's location
whether the user would like an email sent to the contact person when a support analyst is assigned to an incident regarding the program
whether the user would like an email sent to the contact person when a support analyst wants to run a diagnostic or repair routine to help analyze the incident
whether the user would like an email sent to the contact person when a support analyst closes the incident
whether the user wants to require approval from the contact person before a support analyst is allowed to run a diagnostic or repair routine
whether the user wants to allow diagnostic routines to access networked devices
whether the user wants to allow diagnostic routines to have global read access
whether the user wants to allow diagnostic routines to have global write access whether the user wants to allow diagnostic routines to have global delete access whether the user wants to allow diagnostic routines to have global execution access This customization information will be entered into the GUI of the user interface 12, as shown in the sample screen shot of FIG. 7. An embodiment of the customization portion of the wrapper script is further detailed in Appendix B.

At step 304, the wrapper script analyzes these variables to make sure they are in a proper format. Next at step 306, the wrapper script 8 copies the software grouping 6 from its current location on the software source server 16, to the location specified by the user, if that location is different from its present location. At step 308, the wrapper script 8 creates an answer file 28 that includes the variables passed to it from the user interface 12. At step 400, the wrapper script 8 runs the interactive control script 10. This is accomplished by executing the "swask" program and passing it the answer file. The "swask" command is part of Software Distributor's standard functionality and will automatically execute the interactive control script 10, if it is present. At step 310, the wrapper script 8 deletes the answer file 28 and terminates.

Figure 4:
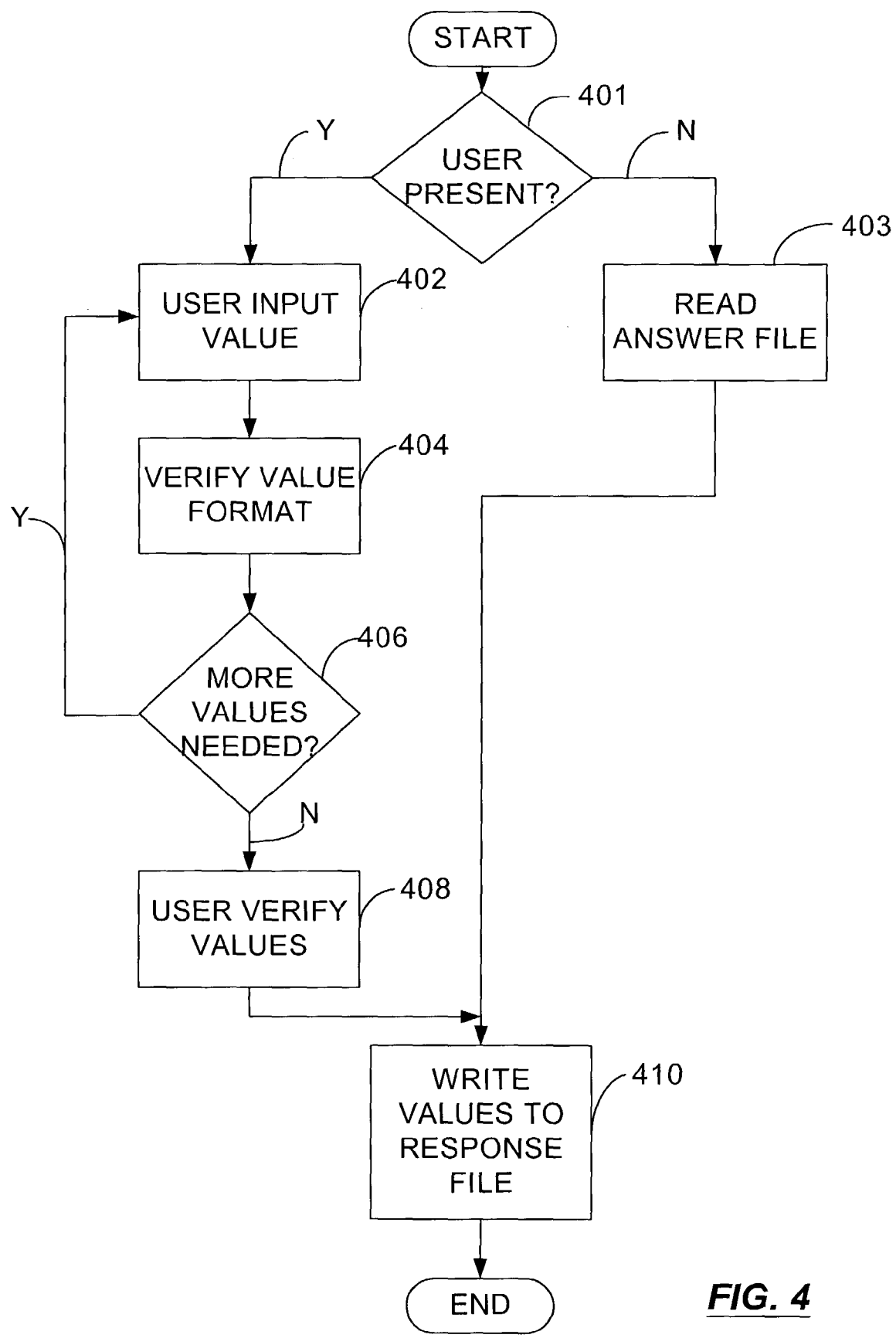
FIG. 4 is a flowchart illustrating the interactive control script used in the present embodiment.

Now referring to FIG. 4, the interactive control script 10 is described in more detail. The purpose of the interactive control script 10 is to create a response file 22, inside the software grouping 6, which contains the information to be used to customize the software grouping 6 upon installation on the workstations 26. (See Appendix A). At step 401, the interactive control script 10 checks to see if a user is present or the program was passed the answer file. If user input is required, the interactive control script 10 branches to step 402 where the user is prompted for the first variable in the above list to be entered. At step 403, the format of the entered variable is checked. At step 404, the interactive control script 10 checks to see if all of the necessary variables have been entered. If more variables are needed, it branches back to step 402. Once all of the variables are entered, the interactive control script 10 branches to step 408. At step 408, all of the user variables are displayed and the user is prompted to confirm that those are the variables the user would like to use to customize the software grouping 6. Upon affirmation by the user, at step 410 the interactive control script 10 writes the variables to the response file 22 and terminates. (See Appendix A).

Since in the present embodiment the wrapper script 8 is passing to the interactive control script 10 the answer file 28, step 401 will instead branch to step 403. At step 403, the interactive control script 10 reads the variables from the answer file 28. At step 410, it writes those variables to the response file 22 and terminates. (See Appendix B).

Figure 5:
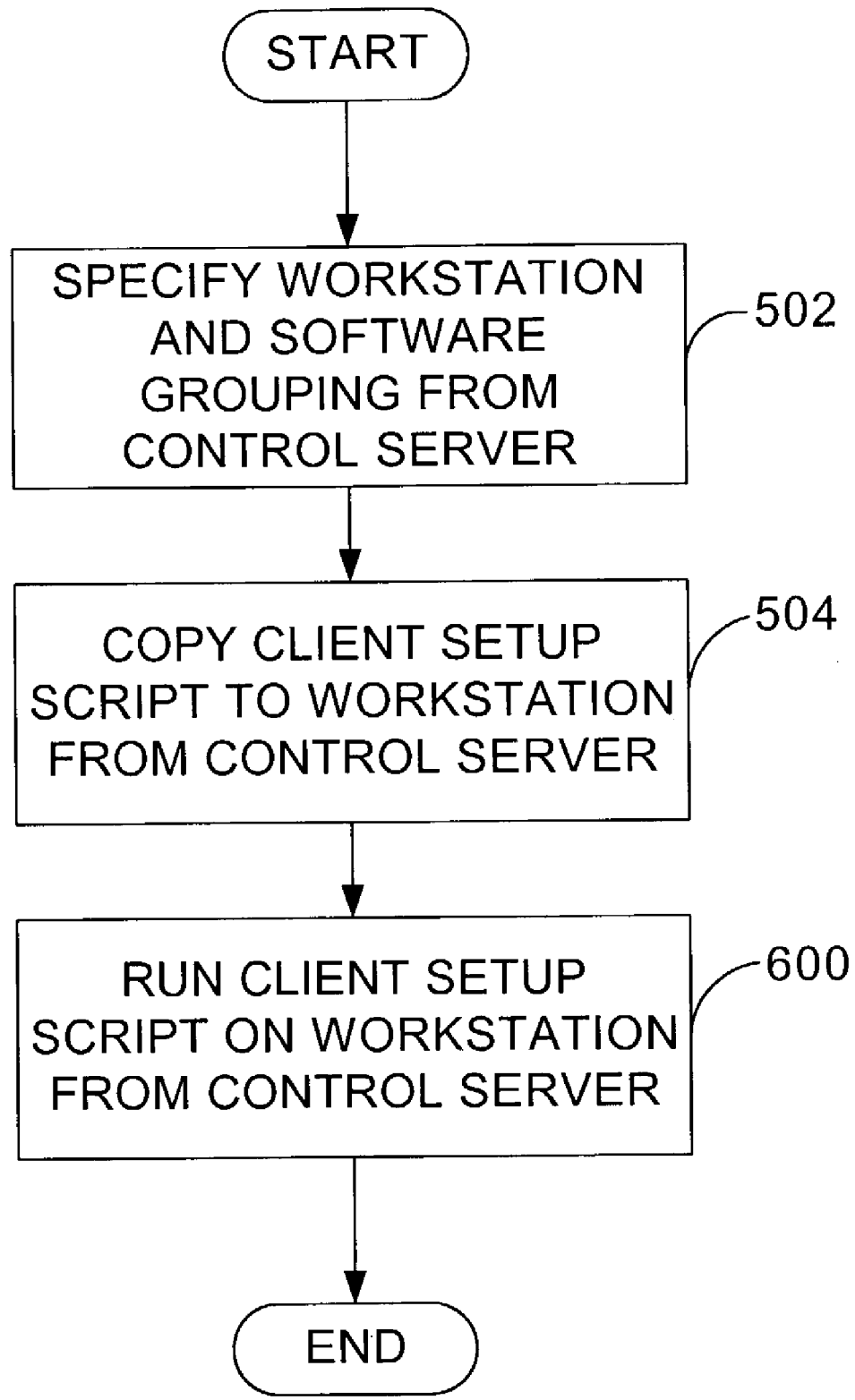
FIG. 5 is a flow chart illustrating the installation of a customized software grouping on a workstation used in the present embodiment.

Once the response file 22 has been created and is part of the software grouping 6, the customization process 300 is complete and the software grouping 6 is ready to be installed on the workstations 26. The installation process 500 is more fully described on FIG. 5. Referring to FIG. 5, at step 502, the user specifies on the user interface 12 the software grouping 6 that the user would like to install and the workstation 26 where the user would like the software grouping 6 installed. This information may be entered into a GUI of the user interface 12 substantially similar to the sample screen shot of FIG. 8. At step 504, the user interface 12 copies the client setup script 14 from the control server 2, to the specified workstation 26. At step 600, the user interface 12 uses the "rexec" command to execute the client setup script 14 on the workstation 26 and then terminates.

Figure 6:
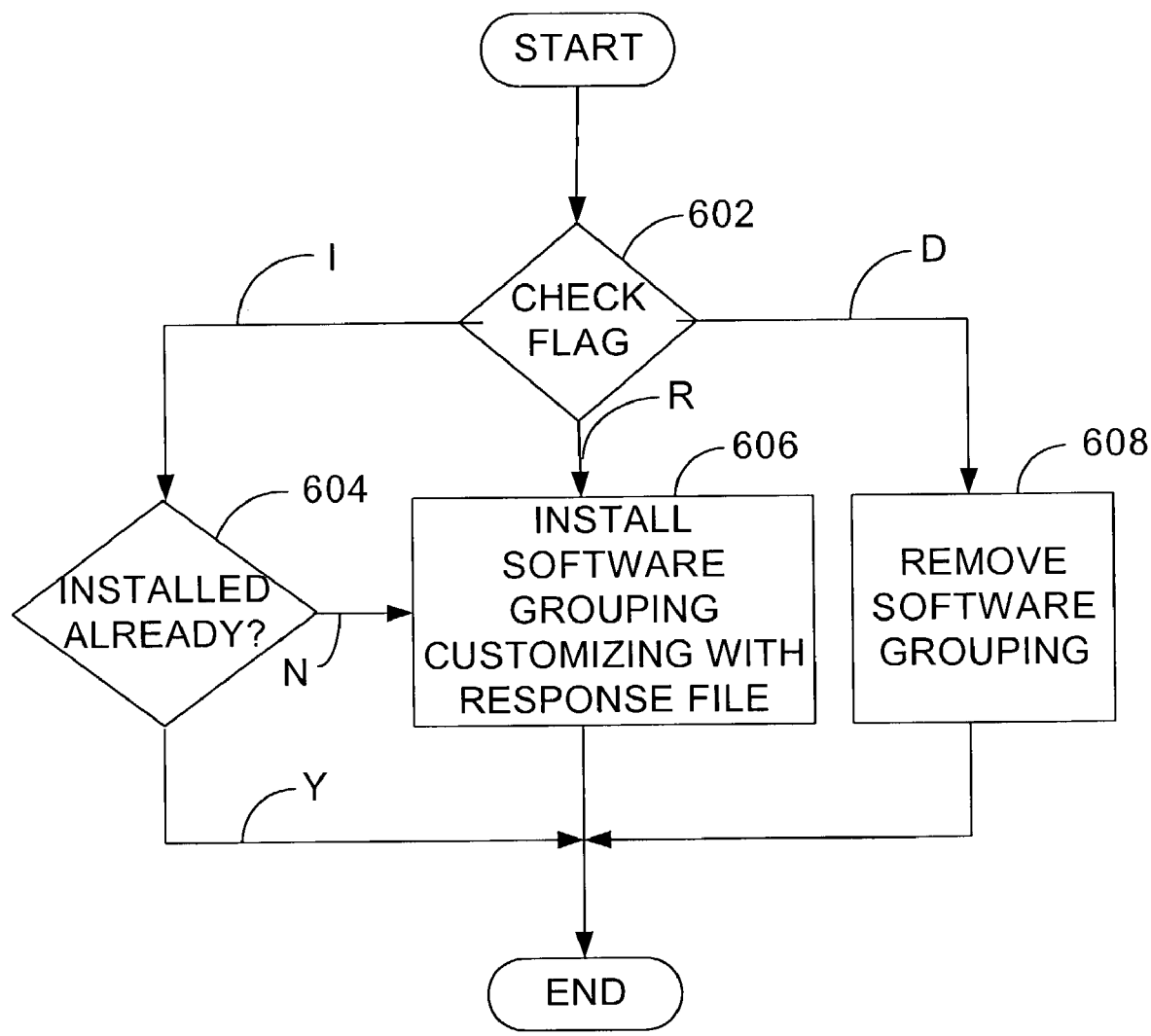
FIG. 6 is a flow chart illustrating the client installation script used in the present embodiment.

Now referring to FIG. 6, the client setup script 14 is more fully described. (See Appendix C). The client setup script 14 can be called with three different flags. At step 602, the client setup script 14 determines which flag was used. A "d" flag indicates that the user wants to delete the software grouping 6 from the workstation 26. The program branches to step 608, deletes the software grouping 6, and terminates. A "r" flag indicates that the user would like to reinstall the software grouping 6 on the workstation 26. The program branches to step 606, and it installs the software grouping 6 that is located on the software source server 16 onto the workstation 26. During the installation, the software grouping 6 uses the response file 22 to customize the installation and avoid having the user of the workstation 26 manually customize the installation. An "i" flag indicates that the user wants to install the software grouping 6. The program branches to step 604 where the program determines if the software grouping 6 is already installed on the workstation 26. If the software grouping 6 is already installed, the program terminates. If the software grouping 6 is not already installed on the workstation 26, the program branches to step 606, installs the software grouping 6, and terminates. (See Appendix C).

Figure 9:
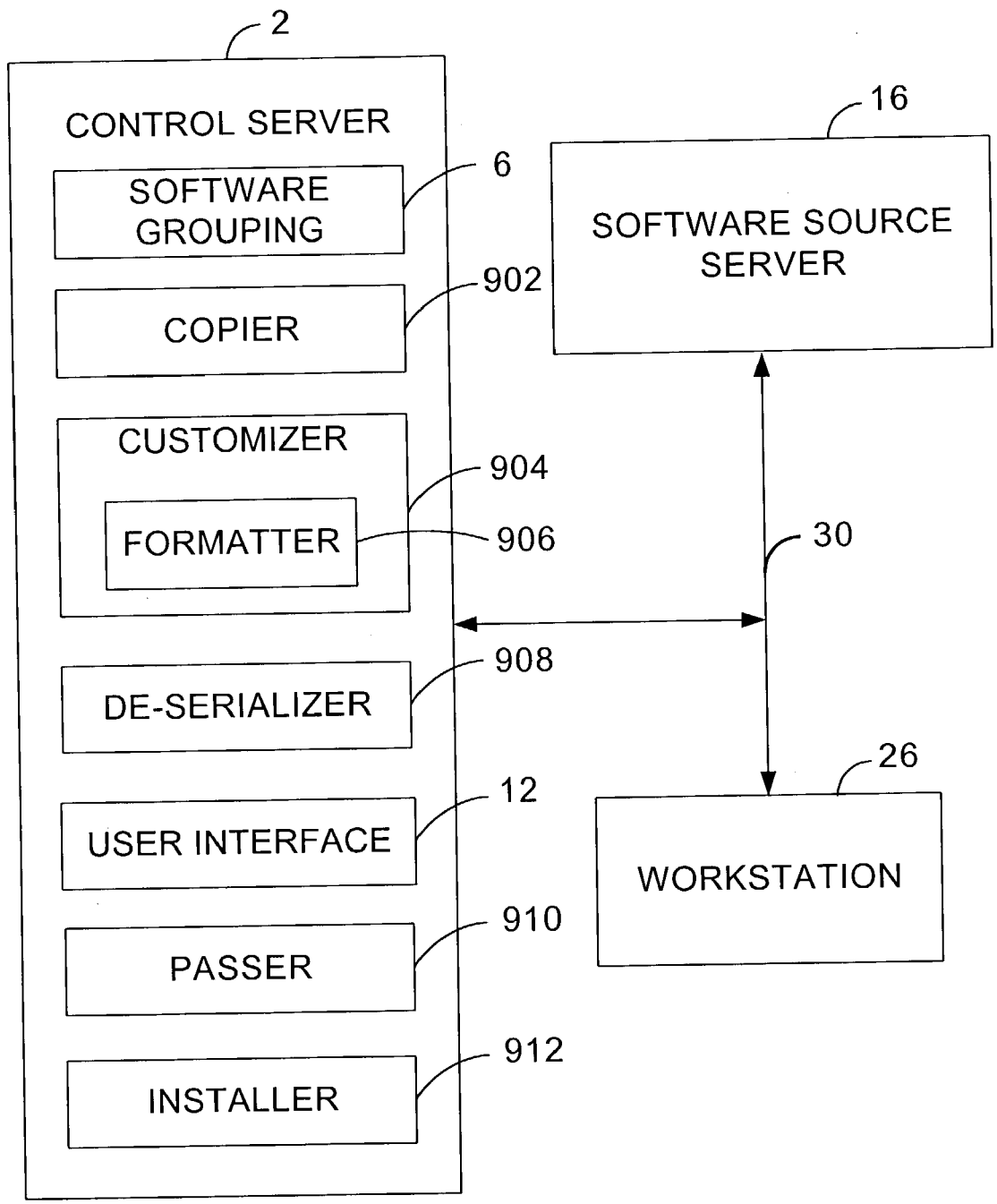
FIG. 9 is a block diagram illustrating the location of the various elements in the present embodiment.

Now referring to FIG. 9, a possible configuration of the elements of the present invention is shown. Initially, no aspect of the present invention are located on the software source server 16 or the workstation 26. The control server 2 contains the software grouping 6, a copier 902, a customizer 904, a de-serializer 908, a user interface 12, an information passer 910, and an installer 912. The format of the software grouping 6 and the user interface 12 have already been described above. The copier 902 copies the software grouping 6 from the control server 2 to the software source server 16 that the user specifies in the user interface 12. The de-serializer 908 is executed on the control server 2, and it remotely executes the "swcopy" command on the software source server 16. This allows the software source server 16 access to the sub-parts of the software grouping 6. The information passer 910 takes the information the user provides through the user interface 12 and sends that information through the network 30 to the software source server 16. This user information on the software source server 16 corresponds to the answer file 28. The customizer 904 takes the user information passed to the software source server 16 and customizes the software grouping 6. One of the subroutines of the customizer 904 is the formatter 906 which remotely converts the user information passed to the software source server 16 into a response file 22 that the software grouping 6 can access. The formatter 906, in the present invention, corresponds to the interactive control script 10. Finally the installer 912 corresponds to the client setup script 14. The installer 912 remotely installs the software grouping 6 located on the software source server 16 onto a workstation 26, using the response file 22 to customize the installation.

It is possible for many of these elements to be combined in on or more scripts or programs, such as including the information passer 910 as part of the customizer 904. In one embodiment, the wrapper script 8 contains the copier 902, the de-serializer 908, and the information passer 910.

Therefore, it can be seen from the foregoing detailed description of an embodiment of the invention that the invention provides a novel method and apparatus for silently customizing software in a multi-platform environment. Although several embodiments and variations of the invention have been described and illustrated, the invention is not to be limited to the specific forms or arrangements of the parts so described and illustrated. Thus, having illustrated and described the principles of the invention in an embodiment, it should be apparent to those of ordinary skill in the art that the invention can be modified in arrangement and detail without departing from such principles.

APPENDIX A

Portion of Interactive Control Script (step 10, FIG. 1; FIG. 4)

```
!/bin/sh
##########################################################
# FILENAME: request.sh
# AUTHOR: Hewlett-Packard
# COPYRIGHT: Hewlett-Packard 2001, All Rights Reserved
# DESCRIPTION
#   This is the Software Distributor "request" control
#   script used by the RST product.
#   This script prompts the user for input, verifies the
#   input with the user, and writes the answers to a
#   "response" file in the $SW_CONTROL_DIRECTORY.

# @(#) $Header: /build/Client/Common/UNIXscripts/request.sh 11 2002/06/14 14:30:09 -0600 claiborne $
##########################################################
# <Example response file>
##########################################################
# server=<serverName>
# firstName=<firstName>
# MiddleInitial="MiddleInitial"
# lastName=<lastName>
# companyName=<companyName>
# Street=<Street>
# City=<City>
# State=<State>
# country=<country>
# PostalCode=<PostalCode>
# officePhone=<officePhone>
# Fax=<Fax>
# emailAddress=<emailAddress>
# JobTitle=<JobTitle>
# HoursAvailability=<Hours of Availablity>
##########################################################
################################
# Main
################################
RESPONSES=""
IFS="
"
# These are the values that we prompt the user for.
# Each value is on its own line.
# Each line is of the format KEY~PROMPT~MAXLEN~REGEXPR~DEFAULTVALUE where
# - If no response is given and DEVAULTVALUE is not "", DEFAULTVALUE is stored.
# - If a response is given, it MUST match REGEXPR.
# - If not REGEXPR is specified than that field can be any value the user enters.
# - If MAXLEN < 1, then the length of the answer is not checked.
VALUEPROMPTS="Server~Enter your Server Name~-1~.~
ContactInfo/firstName~Enter your Contact's First Name (required)~45~.~
ContactInfo/MiddleInitial~Enter your Contact's Middle Initial~1~~
ContactInfo/lastName~Enter your Contact's Last Name (required)~45~.~
ContactInfo/EmailAddress~Enter your Contact's Email Address (required)~255 ~.@.~
ContactInfo/JobTitle~Enter your Contact's Job Title~100~~
ContactInfo_HP_Services/HoursAvailability~Enter your Contact's hours of availability~50~~
ContactInfo/companyName~Enter your Company's Name (required)~100~.~
ContactInfo_HP_Services/Street~Enter your Company's Street Address (required)~100~.~
ContactInfo_HP_Services/Street2~Enter your Company's Street Address 2~100~~
ContactInfo/City~Enter your Company's City (required)~60~.~
ContactInfo/State~Enter your Company's State or Province (required)~32~.~
ContactInfo_HP_Services/PostalCode~Enter your Company's Postal Code~20~~
ContactInfo/country~Enter your Company's 2-Letter Country/Region Code~2~^[A-Z][A-Z]$~
ContactInfo/officePhone~Enter your Office Phone Number (required)~25~.~
ContactInfo_HP_Services/Fax~Enter your Fax Number~25~~
ContactInfo_HP_Services/systemLocation~Enter your System's Location~255~~
GlobalSettings/NOTIFY_ALERT_MAIL_ASSIGNED~Do you want ISEE to email you when an incident is assigned? (y|n[n])~1~^[yn]$~n
GlobalSettings/NOTIFY_ALERT_MAIL_MAP_REQUEST~Do you want ISEE to email you when an Support Analyst wants to run a diagnostic routine on this system? (y|n[y])~1~^[yn]$~y
GlobalSettings/NOTIFY_ALERT_MAIL_CLOSE~Do you want ISEE to email you when a Support Analyst closes an incident? (y|n[n])~1~^[yn]$~n
GlobalSettings/AUTO_RUN~Do you want to allow HP Support Analysts to run a diagnostic routine on this system without your prior approval? (y|n[y])~1~^[yn]$~y
Security/GLOBAL_NET~Do you want to give diagnostic routines access to networked computers or peripherals? (y|n[y])~1~^[yn]$~y
Security/GLOBAL_READ~Do you want to give diagnostic routines \"read\" access to your file system? (y|n[y])~1~^[yn]$~y
Security/GLOBAL_WRITE~Do you want to give diagnostic routines \"write\" access to your file system? (y|n[y])~1~^[yn]$~y
```

APPENDIX A-continued

Portion of Interactive Control Script (step 10, FIG. 1; FIG. 4)

```
Security/GLOBAL_DELETE~Do you want to allow diagnostic routines to delete files from your
system? (y|n[y])~1~`[yn]$~y
Security/GLOBAL_EXEC~Do you want to allow diagnostic routines to execute programs on your
system? (y|n[y])~1~`[yn]$~y
"
CUSTOMPARTNERPROMPTS=""
#ADDNEWPROMPTSHERE
PROXYPROMPTS="GlobalSettings/PROXY~Enter your Proxy Server Name and
Port(NAME:PORT)~-1~~
GlobalSettings/PROXY_USER~Enter your Proxy Server's Login (only if it is authenticated)~-1~~"
PROMPTS=$VALUEPROMPTS$CUSTOMPARTNERPROMPTS$PROXYPROMPTS
RESPONSE_FILE=$SW_CONTROL_DIRECTORY/response
# prompt for and read in the values -
#     start iterating through the lists at position 2 because we start w delim.
for PROMPT in $PROMPTS; do
  PROMPTVAL=`echo $PROMPT | cut -d~ -f2`
  ANSLEN=`echo $PROMPT | cut -d~ -f3`
  REGEXPR=`echo $PROMPT | cut -d~ -f4`
  DEFAULTVAL=`echo $PROMPT | cut -d~ -f5`
  promptAboutValue $PROMPTVAL $ANSLEN $REGEXPR $DEFAULTVAL
  RESPONSES="$RESPONSES\n`escaped $RESPONSE`"
done
getProxyServerPasswd # Stores password in PROXYSERVERPASSWORD
# Give the user a last chance to bail on the selections
clear
echo "You have entered the following information:"
ENTRYNUM=2 # start with 2 because $RESPONSES
for PROMPT in $PROMPTS; do
  PROMPTVAL=`echo $PROMPT | cut -d~ -f2 | cut -d" " -f2-`
  # if we are on country, convert contry code to country name
  if [ $PROMPTVAL = "your Company's 2-Letter Country/Region Code" ]; then
    PROMPTVAL="your Country/Region"
    VALUE=`eval "$ECHO \"$RESPONSES\"" | sed -n "${ENTRYNUM}p"`
    ΦVALUE=`grep "=${VALUE}$" $COUNTRIESFILE | cut -d= -f2`
  else
    VALUE=`eval "$ECHO \"$RESPONSES\"" | sed -n "${ENTRYNUM}p"`
  fi
  echo" * $PROMPTVAL=$VALUE"
  ENTRYNUM=`expr $ENTRYNUM + 1`
done
if [ "`escaped $PROXYSERVERPASSWORD`" != "" ]; then
  echo" * Proxy Server Password=xxxxxxxx"
fi
getYorN "Do you wish to write these values to the response file? (y|n[n])" "n"
if [ "$YorNanswer" = "y" ]; then # write info to response script
  # clear out request script
  if [ -f "$RESPONSE_FILE" ]; then
    rm -f "$RESPONSE_FILE"
  fi
  touch $RESPONSE_FILE
  if [ "$?" -ne 0 ]; then # unable to write response file
    echo 1>&2 "Unable to write to $RESPONSE_FILE"
    echo 1>&2 "Make sure the depot has been swcopied to this host and is not in tape"
    echo 1>&2 "format. Also check that you are authorized to execute Software"
    echo 1>&2 "Distributor commands."
    cleanAndExit 1
  fi
  ENTRYNUM=2 # start with 2 because $RESPONSES
  for PROMPT in $PROMPTS; do
    KEY=`echo $PROMPT | cut -d~ -f1`
    VALUE=`eval "$ECHO \"SRESPONSES\""" | sed -n "${ENTRYNUM}p"`
    writeToFile "$KEY=$VALUE"$RESPONSE_FILE
    ENTRYNUM=`expr $ENTRYNUM + 1`
  done
  writeToFile "proxyPass=`escaped $PROXYSERVERPASSWORD`" $RESPONSE_FILE
  # Close down permissions of response because it may contain
  # proxy server passwords
  chmod 400 $RESPONSE_FILE
  chown root:sys $RESPONSE_FILE
  cleanAndExit 0
else # Don't write info
  echo "Information NOT written to depot."
  cleanAndExit 1
fi
```

APPENDIX B

Portion of Wrapper Script (step 8, FIG. 1; FIG. 3)

```
!/bin/sh
#    ########################################################
#    Filename: setUpClient.sh
#    Description:
#         This file simply a wrapper around Software Distributor
#         commands. This file is called via rexec from the SPOP
#         to deal with installing & removing the ISEEPlatform
#         bundle.
#         If no arguments are specified to this script then a lengthy usage
#         message is printed to stderr and the script exits with a 1.
#         If any arguments are specified then this file outputs message
#         numbers. The corresponding message file is stored on the SPOP.
#         Every message number that this script generates is described
#         in the comments of this script.
#         Normal status message numbers are printed to stdout. Error
#         messages are printed to stderr

#    Usage:
#         setUpClient.sh [flag] [arguments]

#              Only 1 flag can be specified at a time:

#              -i install depot
#                   ARGUMENTS (all arguments are mandatory)
#                        depotSourceLocation
#                   NOTE: Source can be a serialized or unserialized depot.
#                   NOTE: Will NOT reinstall if a depot has alread been laid down.

#              -r reinstall depot
#                   Will install specified depot even if one is installed already.
#                   ARGUMENTS (all arguments are mandatory)
#                        depotSourceLocation
#                   NOTE: Source can be a serialized or unserialized depot.

#              -d delete ISEEPlatform product
#                   removes installed ISEEPlatform depot.
#                   ARGUMENTS: None

#    RETURNS:
#         0 on success
#         1 on failure because of bad parameters specified by the user
#         2 on failure caused by a system problem

#    (©) Hewlett-Packard 2001, all rights reserved
#    @(#) $Header: /src/HP-UX_shell/setUpClient.sh 6 2001/12/14 13:02:45 -0700 claiborne $
########################################################
#######################################
#    Install software only if it's not already
#         installed.
#              $1 = depot source location.
#######################################
Install( )
{
     echo "302" #installing...
     /usr/sbin/swlist $BUNDLENAME > /dev/null 2>&1
     if [ $? -eq 0 ]; then # software is already installed
          echo 1>&2 "204" # Already Installed use -r to reinstall
          return 2
     fi
     /usr/sbin/swinstall -s $1 $BUNDLENAME > /dev/null 2>&1
     if [ $? -ne 0 ]; then
          echo 1>&2 "205" # error installing software.
          echo 1>&2 "305" # see log
          return 2
     fi
     echo "303" # finished installing
     return 0
}
#######################################
#    Install software.
#         If software is already installed, reinstall it.
#              $1 = depot source location.
#######################################
reInstall( )
{
     echo "302" #installing...
     /usr/sbin/swlist $BUNDLENAME > /dev/null 2>&1
```

APPENDIX B-continued

Portion of Wrapper Script (step 8, FIG. 1; FIG. 3)

```
        if [ $? -eq 0 ]; then # software is already installed
                echo "304" # software was previously installed. Reinstalling
        fi
        /usr/sbin/swinstall -x allow_downdate=true -x reinstall=true -x reinstall_files=true -s $1
$BUNDLENAME > /dev/null 2>&1
        if [ $? -ne 0 ]; then
                echo 1>&2 "205" # error installing software.
                echo 1>&2 "305" # see log
                return 2
        fi
        echo "303" # finished installing
}
Remove( )
{
        echo "300" # removing...
        /usr/sbin/swremove $BUNDLENAME > /dev/null 2>&1
        if [ $? -ne 0 ]; then
                echo 1>&2 "203" # Error removing. See log
                echo 1>&2 "305" # see log
                return 2
        fi
        echo "301" # finished removing
        return 0
}
###############################################
#       main
###############################################
if [ $# -eq 0 ]; then
        displayUsage
        exit 1
fi
FLAG=$1
shift
BUNDLENAME=ISEEPlatform
case $FLAG in
-i)
        if [ $# -ne 1 ];then
                echo 1>&2 "200" # wrong number of args for install
                exit 1
        fi
        Install $1
        exit$?
        ;;
-r)
        if [ $# -ne 1 ]; then
                echo 1>&2 "200" # wrong number of args for install
                exit 1
        fi
        reInstall $1
        exit$?
        ;;
-d)
        if [ $# -ne 0 ]; then
                echo 1>&2 "201" # wrong number of args for remove
                exit 1
        fi
        Remove
        exit $?
        ;;
*)
        echo 1>&2 "32" # unrecognized flag
        exit 1
        ;;
esac
exit 0
```

APPENDIX C

Portion of Client Setup Script (step 14, FIG. 1; FIG. 6)

```
###########################################################
#       !/bin/sh
#       File: SetUpDepot.sh

```

APPENDIX C-continued

Portion of Client Setup Script (step 14, FIG. 1; FIG. 6)

```
#       Description:
#           Called from the SPOP to remotely manage depot information
#           on the depot server.
#           If this file is called with no arguments, an *Extensive*
#               usage statement is printed to STDERR.
#           As part of normal execution, this file prints numbers to stdout that
#               correspond to messages in a message file on the SPOP.
#           If this file encounters errors, it will print numbers to stderr that
#               correspond to messages in a message file on the SPOP.
#           Any message numbers that are displayed will be commented in the code.

#       Usage:
#           SetUpDepot.sh <flag> <flagArguments>
#               The following flags are allowed. Only one flag can be specified at a time:
#               -c customize a depot
#                   ARGUMENTS (All arguments are mandatory):
#                       ServerName ContactFirstName ContactMiddleInitial"
#                       ContactLastName ContactEmailAddress(.@.) ContactJobTitle"
#                       ContactHoursAvailablity CompanyName Address1 Address2"
#                       City State PostalCode 2LetterCountryCode([A–Z][A–Z]) OfficePhone"
#                       Fax SystemHande SystemLocation emailWhenIncidentAssigned(y|n)"
#                       emailWhenMapRequested(y|n) emailWhenMapClosed(y|n)"
#                       automaticallyRunMaps(y|n)"
#                       allowMapsAccessToNetworkedDevices(y|n)"
#                       allowMapsGlobalReadAccess(y|n)"
#                       allowMapsGlobalWriteAccess(y|n)"
#                       allowMapsGlobalDeleteAccess(y|n)"
#                       allowMapsGlobalExecAccess(y|n)"
#                       webProxyAndPort, proxyLogin, proxyPasswd"
#                       SourceDepotLocation CustomizedDepotDestination"
#               -d delete a depot
#                           ARGUMENTS (All Arguments are mandatory)
#                       DepotLocation
#               -v view a depot's contact, security, and notification information
#                   ARGUMENTS (All Arguments are mandatory)
#                       DepotLocation
#               -p Use Command Specified in a properties file
#                   ARGUMENTS (All Arguments are mandatory)
#                       FullyQualifiedPropertiesFileName
#                   EXAMPLE:
#                       To use a properties file to move a depot from /depot1 to /depot2
#                           using a properties file named /tmp/properties, create a file
#                           named /tmp/properties and make it contain the following lines:
#                                   -m
#                               /depot1
#                               /depot2
#                           Then execute the following command:
#                                   SetUpDepot.sh -p /tmp/properties
#                   NOTE: The properties file will NOT be deleted after the command
#                           executes.

#       Exits 0 on success and prints msg numbers to stdout
#               1 And prints msg numbers to stderr if we encounter a user error
#               2 And prints msg numbers if we're unable to perform a system operation

#       (@)$Header: /src/HP-UX__shell/setUpDepot.sh 13 2001/12/14 13:02:45 -0700 claiborne $
#       (©) Hewlett-Packard 2001, All Rights reserved
###############################################################
#####################################
#   Customizes the depot with contact information.
#   Assumes contact information variables are set before this function is called.
#####################################
customizeDepot( )
{
    echo "104" # Customizing depot...
    #   Check the format of format-specific variables
    NumWBadFormat=0
    REGEXP='.@.'
    DESCR="21" # email address in wrong format
    checkFormat $EMAIL
    NumWBadFormat='expr $NumWBadFormat + $?'
    REGEXP='[A–Z][A–Z]'
    DESCR="22" # country code in wrong format
    checkFormat $COUNTRY
    NumWBadFormat='expr $NumWBadFormat + $?'
    REGEXP='^[yn]$'
    DESCR="23" # Notify Mail Assigned in wrong format
```

APPENDIX C-continued

Portion of Client Setup Script (step 14, FIG. 1; FIG. 6)

```
        checkFormat $NOTIFY_MAIL_ASSIGNED
        NumWBadFormat=`expr$NumWBadFormat + $?`
        DESCR="24" #Notify Mail Requested in wrong format
        checkFormat $NOTIFY_MAIL_MAP_REQUESTED
        NumWBadFormat=`expr $NumWBadFormat + $?`
        DESCR="25" # Notify Mail Closed (y|n) in wrong format
        checkFormat $NOTIFY_MAIL_CLOSED
        NumWBadFormat=`expr $NumWBadFormat + $?`
        DESCR="26" # Automatically run maps (y|n) in wrong format
        checkFormat $AUTO_RUN
        NumWBadFormat=`expr $NumWBadFormat +$?`
        DESCR="27" # Allow access to network devices (y|n) in wrong format
        checkFormat $GLOBAL_NET
        NumWBadFormat=`expr $NumWBadFormat + $?`
        DESCR="28" # Allow global read access (y|n) in wrong format
        checkFormat $GLOBAL_READ
        NumWBadFormat=`expr $NumWBadFormat + $?`
        DESCR="29" # Allow global write access (y|n) in wrong format
        checkFormat $GLOBAL_WRITE
        NumWBadFormat=`expr $NumWBadFormat + $?`
        DESCR="30" # Allow global delete access (y|n) in wrong format
        checkFormat $GLOBAL_DELETE
        NumWBadFormat=`expr $NumWBadFormat + $?`
        DESCR="31" # Allow global exec access (y|n) in wrong format
        checkFormat $GLOBAL_EXEC
        NumWBadFormat=`expr $NumWBadFormat + $?`
        if [ $NumWBadFormat -ne 0 ]; then
              echo 1>&2 "16" # at least 1 entry had the wrong format
              return 1
        fi
#       Still here? Args are good!
#       Copy depot to destination directory if it's different from the source
        if [ "$SRCDEPOTLOC" != "$DEPOTDEST" ]; then
              moveDepot $SRCDEPOTLOC $DEPOTDEST supressOutput # this exits with msg on error
        fi
#       set up swask answer file.
        tempfile=`mktemp`
        addStrToFile "y" # continue with swask task?
        addStrToFile $SERVER
        addStrToFile $FIRSTNAME
        addStrToFile $MI
        addStrToFile $LASTNAME
        addStrToFile $EMAIL
        addStrToFile $JOBTITLE
        addStrToFile $HOURSAVAILABILTY
        addStrToFile $COMPANYNAME
        addStrToFile $ADDRESS1
        addStrToFile $ADDRESS2
        addStrToFile $CITY
        addStrToFile $STATE
        addStrToFile $ZIP
        addStrToFile $COUNTRY
        addStrToFile $PHONE
        addStrToFile $FAX
        addStrToFile $HANDLE
        addStrToFile $LOCATION
        addStrToFile $NOTIFY_MAIL_ASSIGNED
        addStrToFile $NOTIFY_MAIL_MAP_REQUESTED
        addStrToFile $NOTIFY_MAIL_CLOSED
        addStrToFile $AUTO_RUN
        addStrToFile $GLOBAL_NET
        addStrToFile $GLOBAL_READ
        addStrToFile $GLOBAL_WRITE
        addStrToFile $GLOBAL_DELETE
        addStrToFile $GLOBAL_EXEC
        addStrToFile $PROXY
        addStrToFile $PROXY_USER
        addStrToFile $PROXY_PASS
        addStrToFile "y\n" # write values to depot?
#       execute swask
        cat $tempfile | /usr/sbin/swask -s $DEPOTDEST ISEE-Chorus > /dev/null 2>&1
        if [ $? -ne 0 ]; then
              echo 1>&2 "17" # Problem executing swask;
              echo 1>&2 "111" # see log
              rm -f $temp file
              return 2;
        fi
```

APPENDIX C-continued

Portion of Client Setup Script (step 14, FIG. 1; FIG. 6)

```
    rm -f$tempfile
    #    Still Here? Everything went fine. Exit
    echo "108" # done
    return 0
}
```

The invention claimed is:

1. A method for customizing one or more software distributors including one or more software groupings and one or more interactive control programs or scripts and residing on a software source server compatible with the software distributors from a control server managed by an operating system different from and incompatible with that managing the software source server, comprising:

storing the software distributors in a serialized form on the control server;

copying the software distributors from the control server to the software source server;

de-serializing the software distributors on the software source server;

using one or more programs or scripts running on the control server, gathering user information defining how the software included in the grouping is to be customized;

passing this user information from the control server to the software source server;

using one or more programs or scripts running on the software source server, creating one or more response files on the software source server containing the user information; and using the interactive control programs or scripts running on the software source server, customizing the software grouping under the control of the response file preparatory to installing the software contained in the software groupings.

2. The method of claim 1, the customizing step further comprising:

installing the customized software groupings on one or more workstations.

3. The method of claim 2, the installing step further comprising:

controlling the installation of the software groupings on the workstations from the control server.

4. An apparatus for customizing software, comprising:

a control server;

a software source server connected to the control server for information transfer therebetween;

at least one software grouping residing on the control server, the software grouping stored on the control server being in a serialized format, and the software grouping designed to be customized on the software source server and not on the control server;

a copier on the control server enabling it to copy the software grouping to the software source server;

a de-serializer on the control server enabling it to remotely de-serialize the software grouping on the software source server; and a customizer on the control server enabling it to remotely customize the software grouping on the software source server, said customizer including a formatter that remotely converts user information supplied to the control server and passed to the software source server into a response file that can control the customization of the software grouping on the software source server.

5. The apparatus of claim 4, the customizer further comprising:

a user interface enabling the customizer to collect user information needed to customize the software grouping; and an information passer enabling the customizer to send the user information to the software source server.

6. The apparatus of claim 5, further comprising:

one or more workstations; and an installer on the control server enabling the control server to install the software grouping on the software source server onto the workstations, customizing the installation with the user information.

7. The apparatus of claim 4, further comprising:

one or more workstations; and an installer on the control server enabling the control server to install the software grouping on the software source server onto the workstations, customizing the installation.

8. An article of manufacture for use in programming a control server containing one or more software distributors incompatible with the control server's operating system, the article of manufacture comprising a computer useable storage medium having at least one computer program stored therein that causes the control server to perform the steps of:

communicating from the control server to a software source server with a different operating system compatible with the software distributors;

gathering customization information, formatting the information, and storing the information on the software source server; and customizing software groupings on the software source server with the customization information.

9. The article of manufacture in accordance with claim 8 wherein the at least one computer program further causes the control server to perform the additional steps of:

communicating from the control server to one or more workstations; and installing the customized software grouping from the software source server onto the workstations.

* * * * *